(12) United States Patent
Tsuchihashi

(10) Patent No.: US 12,155,286 B2
(45) Date of Patent: Nov. 26, 2024

(54) ACTUATOR

(71) Applicant: NIDEC SANKYO CORPORATION, Nagano (JP)

(72) Inventor: Masao Tsuchihashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 211 days.

(21) Appl. No.: 18/076,405

(22) Filed: Dec. 7, 2022

(65) Prior Publication Data

US 2023/0198366 A1    Jun. 22, 2023

(30) Foreign Application Priority Data

Dec. 20, 2021    (JP) ................................ 2021-205798

(51) Int. Cl.
   *H02K 33/00* (2006.01)
   *H02K 33/18* (2006.01)
(52) U.S. Cl.
   CPC ................................... *H02K 33/18* (2013.01)
(58) Field of Classification Search
   CPC ........ H02K 33/00; H02K 33/02; H02K 33/16; H02K 33/18; H02K 35/02
   USPC .... 310/25, 15, 12.01, 20, 21, 28–30, 36–37, 310/40 MM
   See application file for complete search history.

(56) References Cited

U.S. PATENT DOCUMENTS

| | | | | |
|---|---|---|---|---|
| 9,774,236 B2* | 9/2017 | Xu | .......................... | H02K 33/04 |
| 9,948,170 B2* | 4/2018 | Jun | .......................... | H02K 33/00 |
| 10,003,746 B2* | 6/2018 | Minamisawa | ........... | G03B 5/00 |
| 10,305,357 B2* | 5/2019 | Nakamura | ............. | H02K 33/16 |
| 10,315,221 B2* | 6/2019 | Mao | ........................ | B06B 1/045 |
| 10,447,130 B2* | 10/2019 | Mao | ........................ | B06B 1/045 |
| 10,447,131 B2* | 10/2019 | Mao | ........................ | H02K 33/16 |
| 10,447,134 B2* | 10/2019 | Mao | ........................ | H02K 33/02 |
| 10,596,594 B2* | 3/2020 | Ling | ........................ | H02K 33/02 |
| 10,674,278 B2* | 6/2020 | Zhou | ...................... | H04R 9/025 |
| 10,951,104 B2* | 3/2021 | Takeda | ................. | H02K 41/031 |
| 11,201,531 B2* | 12/2021 | Jin | ........................ | H02K 33/16 |
| 11,716,003 B1* | 8/2023 | Miesner | ................. | H02K 33/16 310/27 |
| 11,909,273 B2* | 2/2024 | Hatano | .................. | H02K 33/18 |
| 2009/0267423 A1* | 10/2009 | Kajiwara | ............... | H02K 33/02 310/38 |

(Continued)

FOREIGN PATENT DOCUMENTS

JP    2020102901    7/2020

*Primary Examiner* — Maged M Almawri
(74) *Attorney, Agent, or Firm* — JCIPRNET

(57) ABSTRACT

According to an embodiment, a support body of an actuator is provided with a first holder member and a second holder member that are made of resin, a coil, and a first plate and a second plate that are made of metal. The first plate is assembled to a first coil holding portion of the first holder member and a second coil holding portion of the second holder member from the Z1 side, and then the coil is arranged between the first coil holding portion and the second coil holding portion. After that, an adhesive is filled into a central hole of the coil, and the second plate is assembled from the Z2 side. A case abuts against a first side plate portion of the first holder member, and a second side plate portion of the second holder member in Z direction, and the case is thus positioned.

9 Claims, 11 Drawing Sheets

(56) References Cited

U.S. PATENT DOCUMENTS

| | | | |
|---|---|---|---|
| 2013/0313919 A1* | 11/2013 | Nakamura | H02K 33/16 310/25 |
| 2016/0372998 A1* | 12/2016 | Xu | H02K 33/16 |
| 2017/0033627 A1* | 2/2017 | Xu | H02K 1/34 |
| 2017/0144191 A1* | 5/2017 | Mao | B06B 1/045 |
| 2017/0288525 A1* | 10/2017 | Lee | H02K 33/04 |
| 2017/0310203 A1* | 10/2017 | Takeda | H02K 33/16 |
| 2017/0373578 A1* | 12/2017 | Wu | H02K 33/16 |
| 2018/0059794 A1* | 3/2018 | Nakamura | H02K 33/02 |
| 2018/0248458 A1* | 8/2018 | Amemiya | H02K 55/04 |
| 2018/0297061 A1* | 10/2018 | Mao | H02K 5/04 |
| 2018/0297070 A1* | 10/2018 | Xu | B06B 1/045 |
| 2018/0297071 A1* | 10/2018 | Xu | B06B 1/045 |
| 2018/0297077 A1* | 10/2018 | Chai | B06B 1/045 |
| 2018/0351442 A1* | 12/2018 | Liu | H02K 33/16 |
| 2019/0081544 A1* | 3/2019 | Zhu | H02K 33/02 |
| 2019/0190365 A1* | 6/2019 | Takeda | H02K 33/18 |
| 2019/0305630 A1* | 10/2019 | Mori | H01F 27/2823 |
| 2019/0305658 A1* | 10/2019 | Mori | H02K 33/12 |
| 2019/0305660 A1* | 10/2019 | Tsuchihashi | H02K 33/16 |
| 2019/0315070 A1* | 10/2019 | Yanagisawa | H02K 33/16 |
| 2020/0044526 A1* | 2/2020 | Tang | H02K 33/18 |
| 2020/0044541 A1* | 2/2020 | Takeda | H02K 33/16 |
| 2020/0059147 A1* | 2/2020 | Kitahara | H02K 33/16 |
| 2020/0107134 A1* | 4/2020 | Mori | H04R 7/18 |
| 2020/0161955 A1* | 5/2020 | Kitahara | H02K 33/16 |
| 2020/0204054 A1* | 6/2020 | Mori | H02K 33/02 |
| 2021/0075306 A1* | 3/2021 | Little | H02K 33/02 |
| 2021/0359583 A1* | 11/2021 | Toyota | H02K 33/16 |
| 2022/0200428 A1* | 6/2022 | Shao | H02K 33/02 |
| 2022/0200433 A1* | 6/2022 | Mao | H02K 33/18 |
| 2022/0209634 A1* | 6/2022 | Ma | H02K 33/02 |
| 2022/0247295 A1* | 8/2022 | Takei | H02K 9/223 |
| 2022/0352801 A1* | 11/2022 | Kitahara | H02K 33/16 |
| 2022/0368206 A1* | 11/2022 | Ma | H02K 33/02 |

\* cited by examiner

ACTUATOR

CROSS REFERENCE TO RELATED APPLICATION

The present invention claims priority under 35 U.S.C. § 119 to Japanese Application No. 2021-205798 filed Dec. 20, 2021, the entire content of which is incorporated herein by reference.

BACKGROUND

Field of the Invention

At least an embodiment of the present invention relates to an actuator which vibrates a movable body.

Description of the Related Documents

Japanese Patent Application Laid-Open No. 2020-102901 (JPA 2020-102901) discloses an actuator which is provided with a movable body including magnets, and a support body including a coil, and vibrates the movable body relative to the support body by applying a drive current to the coil. This type of actuator uses an elastic body or a viscoelastic body as a connecting body which connects the support body and the movable body. When the movable body is vibrated, a reaction force corresponding to the vibration of the movable body is applied to the support body through the connecting body. As a result, a user who has touched the support body can feel the vibration.

In the actuator of JPA 2020-102901, the support body includes a coil holder. The coil is an air core coil, and is disposed in a coil placement hole provided in a plate portion of the coil holder. A metal plate is attached to the coil holder to cover the plate portion and the coil from both sides. The movable body includes a first yoke opposed to the coil from one side, and a second yoke opposed to the coil from the other side, and magnets are fixed to the first yoke and the second yoke, respectively. The connecting body connects the plate and each of the yokes.

In actuators provided with magnetic drive mechanisms, there is a demand for making a coil larger in order to improve thrust force. However, there arises a problem in which if the coil is made larger, the outside shape of the actuator is increased in size. For example, in the configuration of JPA 2020-102901, each part of the coil holder made of resin must have a predetermined thickness or more to ensure the strength. Therefore, there is a limit to thinning of a resin portion extending along the long side of the coil, and it is difficult to reduce the width of the plate portion in which the coil placement hole is provided. Therefore, it is difficult to make the coil larger without affecting the outside shape of the actuator and the amplitude of the movable body.

Therefore, a structure in which a coil is directly fixed to a metal plate, instead of using a coil holder made of resin, has also been proposed. However, if a coil assembly is structured by a metal plate and a coil without using a coil holder made of resin, a positioning structure cannot be provided on the coil holder made of resin as has been done conventionally. For this reason, it is difficult to accurately position a case.

At least an embodiment of the present invention proposes a configuration which not only reduces the effect of an increase in size of the coil on the outside shape of the actuator and the amplitude of the movable body, but also enables the case to be assembled accurately.

SUMMARY

An actuator according to at least an embodiment of the present invention includes: a movable body; a support body including a case which accommodates the movable body; a connecting body connected to the movable body and the support body; and a magnetic drive circuit which includes a coil and a magnet that is opposed to the coil in a first direction, and causes the movable body to vibrate relative to the support body in a second direction intersecting the first direction, in which the support body includes: a first holder member, which is made of resin, including a first coil holding portion disposed on one side of a third direction intersecting the first direction and also the second direction with respect to the coil, and a first side plate portion extending in the first direction from an end of the first coil holding portion on the one side of the third direction; a second holder member, which is made of resin, including a second coil holding portion disposed on the other side of the third direction with respect to the coil, and a second side plate portion extending in the first direction from an end of the second coil holding portion on the other side of the third direction; a first plate made of metal and overlapping the coil, the first coil holding portion, and the second coil holding portion from one side of the first direction; and a second plate made of metal and overlapping the coil, the first coil holding portion, and the second coil holding portion from the other side of the first direction, and in which the first plate and the second plate are positioned with respect to the first coil holding portion and the second coil holding portion, and the case is positioned with respect to the first side plate portion and the second side plate portion.

According to at least an embodiment of the present invention, a coil assembly is configured by arranging the first holder member, which is made of resin, including the first coil holding portion, and the second holder member, which is made of resin, including the second coil holding portion on both sides of the coil in the third direction, and covering the coil, the first coil holding portion, and the second coil holding portion by the first plate and the second plate, which are made of metal, from both sides of the first direction. As described above, by dividing a coil holder into two members, both sides of the coil in the second direction, which have conventionally been surrounded by resin, can be configured not to be surrounded by resin. Therefore, the coil can be made larger without increasing the dimension of the coil assembly in the second direction. Further, the case, the first plate, and the second plate are all positioned with respect to the first holder member and the second holder member. Therefore, the case can be positioned accurately.

In at least an embodiment of the present invention, the embodiment should preferably be configured such that: the first plate includes a first plate portion overlapping the coil, the first coil holding portion, and the second coil holding portion from the one side of the first direction, and a first bending portion bent in the other side of the first direction from ends of the first plate portion in the second direction; the second plate includes a second plate portion overlapping the coil, the first coil holding portion, and the second coil holding portion from the other side of the first direction, and a second bending portion bent in the one side of the first direction from ends of the second plate portion in the second direction; and the first bending portion and the second bending portion cover side surfaces of the coil in the second direction. With such a configuration, rigidity of the first plate and the second plate against bending in the third direction can be increased. Further, since the first bending portion and the second bending portion can cover the side surfaces of the coil in a vibration direction (second direction), it is possible to prevent the coil from colliding with the movable body and being damaged.

In at least an embodiment of the present invention, the embodiment should preferably be configured such that: the first plate includes a first fixing portion bent in the other side of the first direction from edges on both sides of the second direction at both ends of the first plate portion in the third direction; the second plate includes a second fixing portion bent in the one side of the first direction from edges on both sides of the second direction at both ends of the second plate portion in the third direction; a claw portion is provided at each of four places on side surfaces on both sides of the first coil holding portion in the second direction, and side surfaces on both sides of the second coil holding portion in the second direction; and at each of the four places on the both sides of the first coil holding portion in the second direction, and the both sides of the second coil holding portion in the second direction, a first cutout portion provided in the first fixing portion and a second cutout portion provided in the second fixing portion overlap one another in the second direction, and the claw portion is engaged with the first cutout portion and the second cutout portion. With such a configuration, the first coil holding portion and the second coil holding portion are prevented from coming off from between the first plate and the second plate, and the first holder member and the second holder member are positioned in the third direction. Moreover, the first plate and the second plate can be positioned in the third direction via the claw portion. Furthermore, the coil assembly can be assembled without welding or using fixing components.

In at least an embodiment of the present invention, the embodiment should preferably be configured such that: the claw portion provided on the first coil holding portion has a tapered shape in which a protruding dimension in the second direction increases toward the one side of the third direction; and the claw portion provided on the second coil holding portion has a tapered shape in which a protruding dimension in the second direction increases toward the other side of the third direction. With such a configuration, it is possible to adopt an assembling method of assembling the coil assembly whereby the assembly is conducted by first assembling the first plate and the second plate, and inserting the first coil holding portion and the second coil holding portion between the first plate and the second plate, while pressing and flexing the first fixing portion of the first plate and the second fixing portion of the second plate by inclined surfaces provided on the respective claw portions.

In at least an embodiment of the present invention, the embodiment should preferably be configured such that: at an edge on the other side of the first direction of a first opening portion provided in the first fixing portion, a first bent portion extending in the one side of the first direction, and then bent toward the center of the first plate portion in the second direction is provided; at an edge on the one side of the first direction of a second opening portion provided in the second fixing portion, a second bent portion extending in the other side of the first direction, and then bent toward the center of the second plate portion in the second direction is provided; and the second plate is engaged with the first plate in the first direction as the second bent portion abuts against the first bent portion from the other side of the first direction. With such a configuration, the assembly can be conducted by a method of positioning the first plate and the second plate such that the first opening portion and the second opening portion overlap one another, and pressing an edge of the first opening portion and an edge of the second opening portion by a jig from the outside, thereby forming the first bent portion and the second bent portion. Thus, assembly work of the coil assembly is easy. In addition, since such a fixing structure is realized by simply forming an opening portion at a predetermined position in the plate, manufacturing of the components is easy.

In at least an embodiment of the present invention, the embodiment should preferably be configured such that: the first plate includes a first fixing portion bent in the other side of the first direction from edges on both sides of the second direction at both ends of the first plate portion in the third direction; the second plate includes a second fixing portion bent in the one side of the first direction from edges on both sides of the second direction at both ends of the second plate portion in the third direction; at an edge on the other side of the first direction of a first opening portion provided in the first fixing portion, a first bent portion extending in the one side of the first direction, and then bent toward the center of the first plate portion in the second direction is provided; the second fixing portion overlaps the first fixing portion in the second direction; at an edge on the one side of the first direction of a second opening portion provided in the second fixing portion, a second bent portion extending in the other side of the first direction, and then bent toward the center of the second plate portion in the second direction is provided; and the second plate is engaged with the first plate in the first direction as the second bent portion abuts against the first bent portion from the other side of the first direction. With such a configuration, as described above, the assembly can be conducted by a method of positioning the first plate and the second plate such that the first opening portion and the second opening portion overlap one another, and pressing an edge of the first opening portion and an edge of the second opening portion by a jig from the outside, thereby forming the first bent portion and the second bent portion. Thus, assembly work of the coil assembly is easy. In addition, since such a fixing structure is realized by simply forming an opening portion at a predetermined position in the plate, manufacturing of the components is easy.

In at least an embodiment of the present invention, the embodiment should preferably be configured such that: the first plate includes a first raised portion extending in the one side of the first direction from an edge on both sides of the first plate portion in the third direction; and the second plate includes a second raised portion extending in the other side of the first direction from an edge on both sides of the second plate portion in the third direction. With such a configuration, rigidity of the first plate and the second plate against bending in the second direction can be increased.

In at least an embodiment of the present invention, the embodiment should preferably be configured such that: the movable body includes a yoke holding the magnet; the yoke includes a first opposed portion opposed to the first plate from the one side of the first direction, a second opposed portion opposed to the second plate from the other side of the first direction, and a pair of connection portions disposed on both sides of the coil in the second direction; the first side plate portion is opposed to the yoke from the one side of the third direction; and the second side plate portion is opposed to the yoke from the other side of the third direction. With such a configuration, the first side plate portion and the second side plate portion function as a stopper which restricts the movement of the movable body in the third direction when an impact such as a fall is applied. Therefore, it is possible to suppress breaking of the actuator due to an impact such as a fall.

In at least an embodiment of the present invention, the embodiment should preferably be configured such that the connecting body includes: a first connecting body to connect the first opposed portion and the first plate, and a second connecting body to connect the second opposed portion and the second plate. With such a configuration, the connecting body can be arranged inside the yoke to connect the coil assembly to the yoke. Therefore, since there is no need to secure a space for arranging the connecting body in a gap between the case and the yoke, the dimension of the actuator in the first direction can be reduced.

According to at least an embodiment of the present invention, a coil assembly is configured by arranging the first holder member, which is made of resin, including the first coil holding portion, and the second holder member, which is made of resin, including the second coil holding portion on both sides of the coil in the third direction, and covering the coil, the first coil holding portion, and the second coil holding portion by the first plate and the second plate, which are made of metal, from both sides of the first direction. As described above, by dividing a coil holder into two members, both sides of the coil in the second direction, which have conventionally been surrounded by resin, can be configured not to be surrounded by resin. Therefore, the coil can be made larger without increasing the dimension of the coil assembly in the second direction. Further, the case, the first plate, and the second plate are all positioned with respect to the first holder member and the second holder member. Therefore, the case can be positioned accurately.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

An embodiment of an actuator to which at least an embodiment of the present invention is applied will now be described with reference to the drawings.

Overall Configuration

Figure 1A:
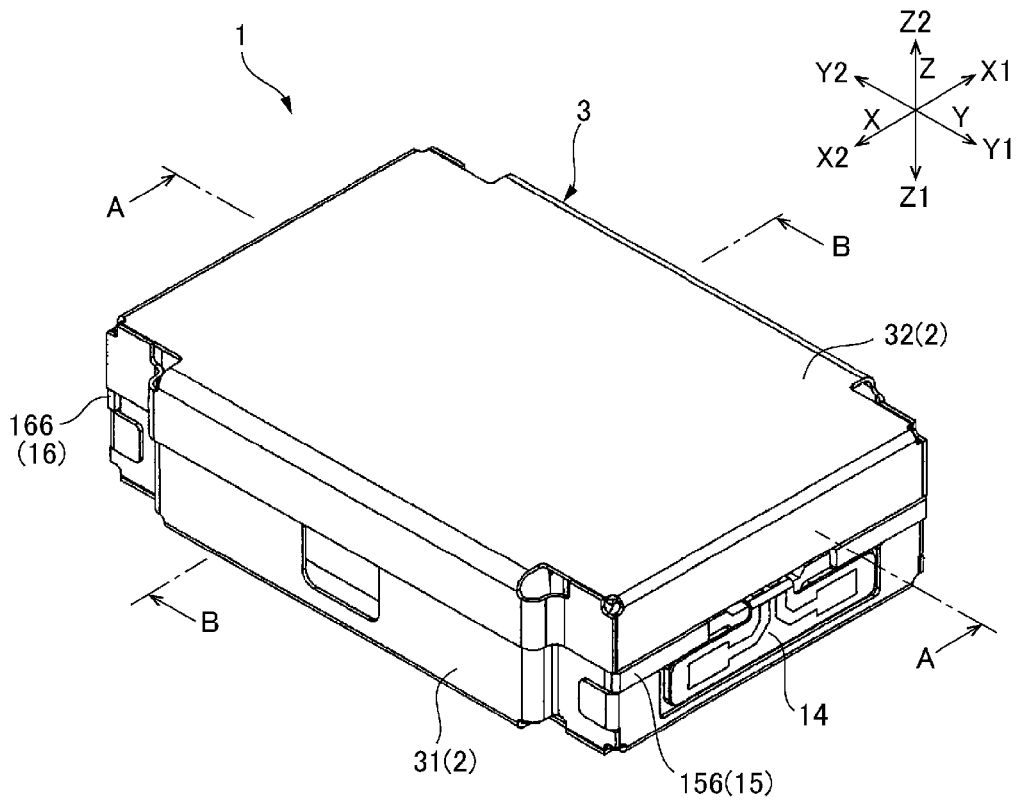
FIGS. 1A and 1B are perspective views of an actuator to which at least an embodiment of the present invention is applied as seen from a Z2 direction side and a Z1 direction side.

FIG. 1A is a perspective view of an actuator 1 to which at least an embodiment of the present invention is applied as seen from a Z2 direction side.

Figure 1B:
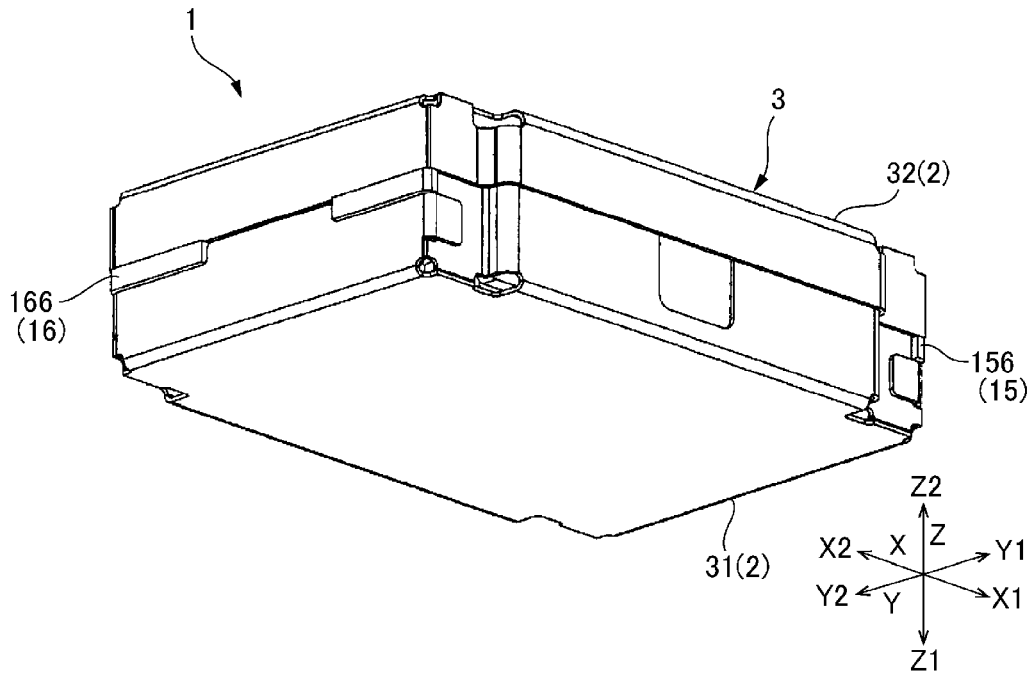
Figure 2:
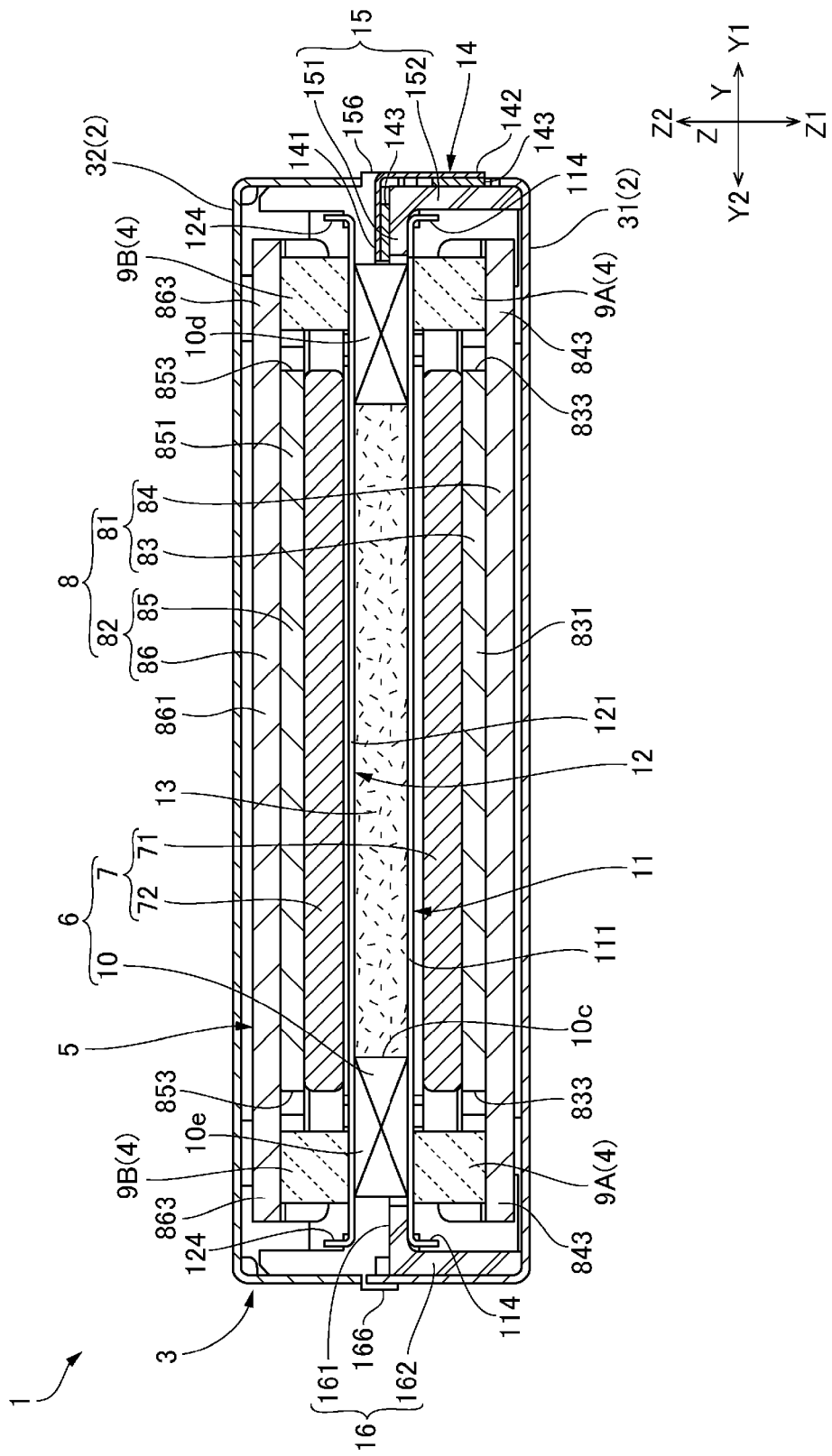
FIG. 2 is a cross-sectional view of the actuator taken along a longitudinal direction thereof, or more specifically, line A-A in FIG. 1A.
Figure 3:
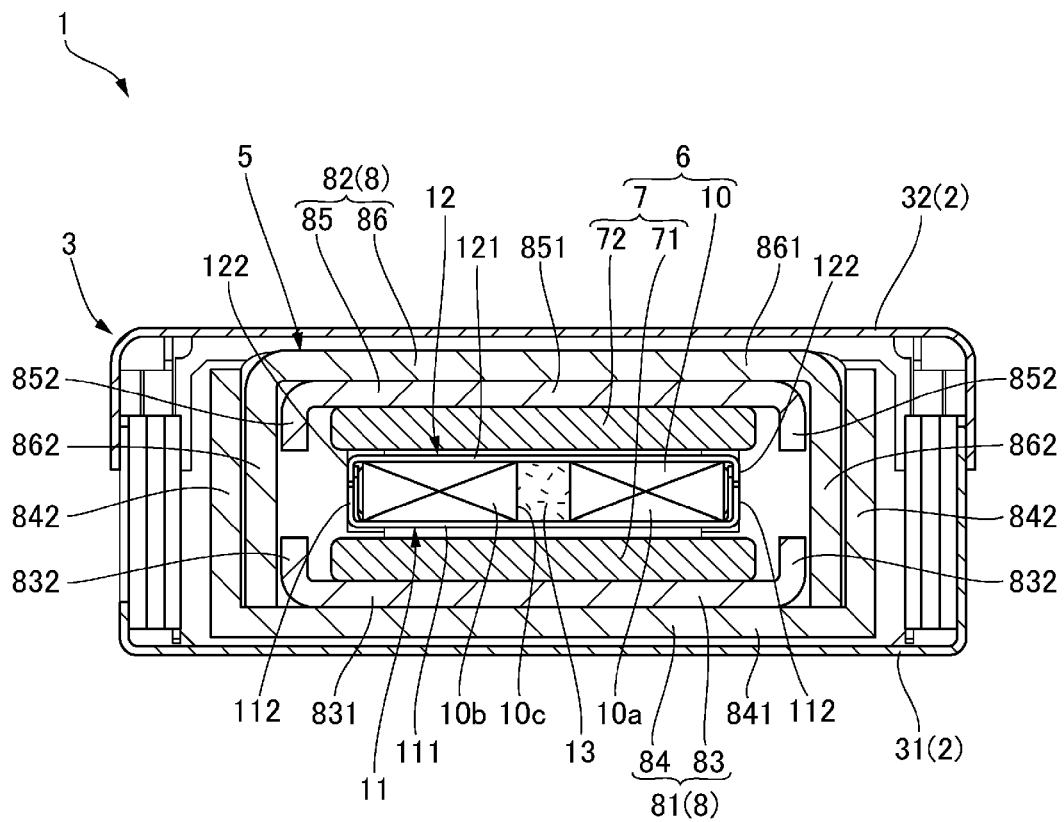
FIG. 3 is a cross-sectional view of the actuator taken along a direction orthogonal to the longitudinal direction, or more specifically, line B-B in FIG. 1A.

FIG. 1B is a perspective view of the actuator 1 to which at least an embodiment of the present invention is applied as seen from a Z1 direction side. FIG. 2 is a cross-sectional view of the actuator 1 taken along a longitudinal direction thereof, or more specifically, line A-A in FIG. 1A. FIG. 3 is a cross-sectional view of the actuator 1 taken along a direction orthogonal to the longitudinal direction, or more specifically, line B-B in FIG. 1A.

The actuator 1 is used as a tactile device that transmits information by vibration. As illustrated in FIGS. 1A and 1B, the outside shape of the actuator 1 is in the form of a rectangular parallelepiped. The actuator 1 generates vibration in a transverse direction of the actuator outside shape. In the description below, the transverse direction in which vibration is generated will be referred to as X direction (second direction); the longitudinal direction of the actuator 1, which is orthogonal to the X direction, will be referred to as Y direction (third direction); and a thickness direction (height direction) of the actuator 1, which is orthogonal to the X direction and the Y direction, will be referred to as Z direction (first direction). Further, one side of the X direction will be referred to as X1 direction, and the other side will be referred to as X2 direction. One side of the Y direction will be referred to as Y1 direction, and the other side will be referred to as Y2 direction. One side of the Z direction will be referred to as Z1 direction, and the other side will be referred to as Z2 direction.

As illustrated in FIGS. 1A, 1B, 2, and 3, the actuator 1 includes a support body 3 including a case 2 which defines the outside shape, and a movable body 5 which is accommodated inside the case 2. Further, the actuator 1 is provided with a connecting body 4 which connects the support body 3 and the movable body 5, and a magnetic drive circuit 6 which relatively moves the movable body 5 with respect to the support body 3 in the X direction (see FIGS. 2 and 3).

Support Body

As illustrated in FIGS. 2 and 3, the support body 3 is provided with a coil 10, a first plate 11 made to overlap the coil 10 in the Z1 direction side, and a second plate 12 made to overlap the coil 10 in the Z2 direction side. The first plate 11 and the second plate 12 are made from a non-magnetic metal. The coil 10 is positioned at the center of the case 2 in the Z direction. The coil 10 is a flat air core coil, and a thickness direction thereof is oriented in the Z direction. The coil 10 has an oval shape that is long in the Y direction, and includes a pair of long side portions 10a and 10b (FIGS. 3 and 7) extending parallel to each other in the Y direction. A central hole 10c extending in the Y direction is provided between the pair of long side portions 10a and 10b. Further, the coil 10 includes an arc portion 10d connecting end portions on the Y1 side of the long side portions 10a and 10b, and an arc portion 10e connecting end portions on the Y2 side of the long side portions 10a and 10b (see FIGS. 7 and 8).

As illustrated in FIG. 2, the support body 3 is provided with a first holder member 15 disposed on the Y1 side of the coil 10, and a second holder member 16 disposed on the Y2 side of the coil 10. The first holder member 15 and the second holder member 16 are made from resin. The first holder member 15 includes: a first coil holding portion 151 disposed between the first plate 11 and the second plate 12; and a first side plate portion 152 extending from an end on the Y1 side of the first coil holding portion 151 in the Z1 direction and the Z2 direction. The second holder member 16 includes: a second coil holding portion 161 disposed between the first plate 11 and the second plate 12; and a second side plate portion 162 extending from an end on the Y2 side of the second coil holding portion 161 in the Z1 direction and the Z2 direction. The coil 10 is disposed between the first coil holding portion 151 and the second coil holding portion 161.

A power feed substrate 14 is fixed to the first holder member 15. In the present embodiment, the power feed substrate 14 is a flexible printed circuit board. Alternatively, the power feed substrate 14 may be a rigid substrate.

The coil 10 includes two coil wires (not shown) drawn in the Y1 direction, and the coil wires are connected to a wiring pattern provided on a surface of the power feed substrate 14. Power is supplied to the coil 10 via the power feed substrate 14.

In assembling the actuator 1, a coil assembly 30 (FIG. 6) formed by assembling together the coil 10, the first plate 11, the second plate 12, the first holder member 15, and the second holder member 16 is structured. Then, the movable body 5 is assembled to surround the coil assembly 30, and the movable body 5 and the coil assembly 30 are connected by means of the connecting body 4. After that, the coil assembly 30 and the movable body 5 are accommodated in the case 2.

As illustrated in FIGS. 1A, 1B, 2, and 3, the case 2 is provided with a first case member 31 and a second case member 32, which are stacked on top of each other in the Z direction. The first case member 31 is assembled to the first holder member 15 and the second holder member 16 from the Z1 direction side. The second case member 32 is assembled to the first holder member 15 and the second holder member 16 from the Z2 direction side.

Movable Body

The movable body 5 includes a magnet 7 and a yoke 8. As illustrated in FIGS. 2 and 3, the magnet 7 is opposed to the coil 10 in the Z direction. The coil 10 and the magnet 7 constitute the magnetic drive circuit 6. The movable body 5 includes, as the magnet 7, a first magnet 71 and a second magnet 72. The first magnet 71 is positioned on the Z1 direction side of the coil 10. The second magnet 72 is positioned on the Z2 direction side of the coil 10.

The first magnet 71 and the second magnet 72 are polarized into two poles in the X direction. As illustrated in FIG. 3, when the movable body 5 and the support body 3 are assembled, the long side portions 10a and 10b of the coil 10 are opposed to the first magnet 71 in the Z1 direction, and are opposed to the second magnet 72 in the Z2 direction.

Figure 4:
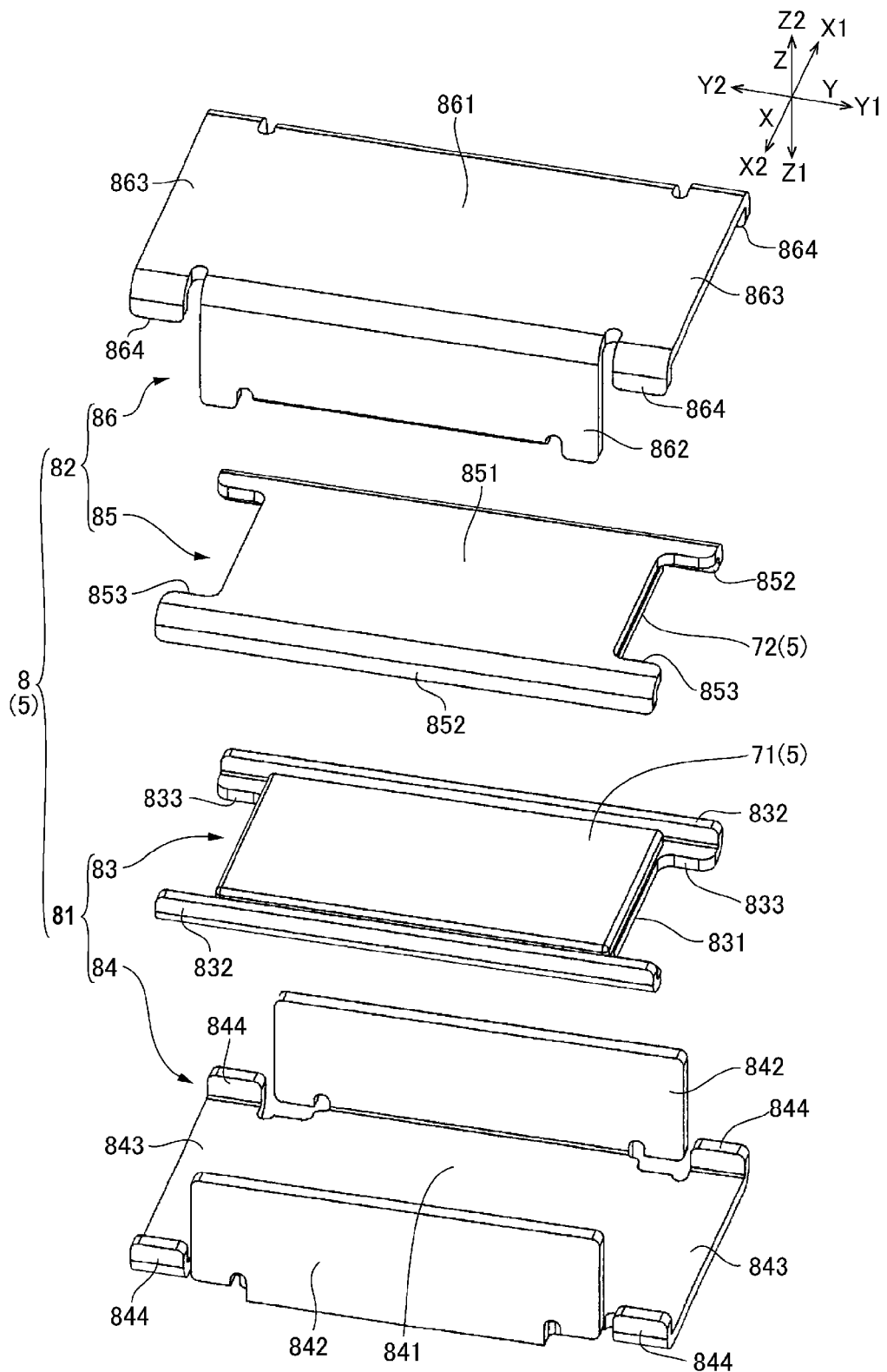
FIG. 4 is an exploded perspective view of a movable body as seen from the Z2 direction side.
Figure 5:
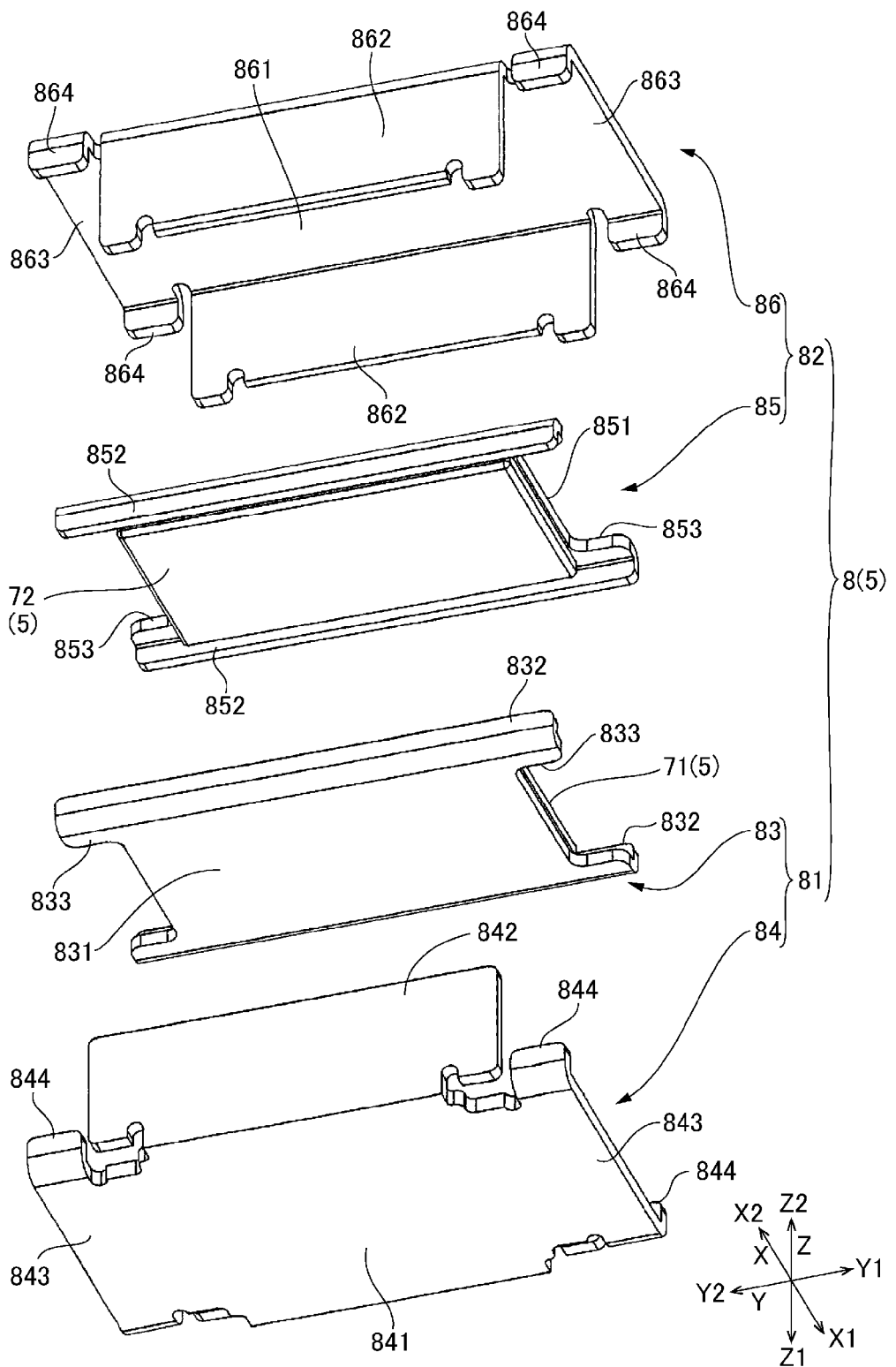
FIG. 5 is an exploded perspective view of the movable body as seen from the Z1 direction side.

FIG. 4 is an exploded perspective view of the movable body 5 as seen from the Z2 direction side. FIG. 5 is an exploded perspective view of the movable body 5 as seen from the Z1 direction side. In the present embodiment, the yoke 8 is made from a magnetic material. As illustrated in FIGS. 2 to 5, the yoke 8 includes a first yoke 81 and a second yoke 82. The first yoke 81 includes a first inner member 83 which overlaps the coil 10 from the Z1 direction side, and a first outer member 84 which overlaps the first inner member 83 from the Z1 direction. The second yoke 82 includes a second inner member 85 which overlaps the coil 10 from the Z2 direction side, and a second outer member 86 which overlaps the second inner member 85 from the Z2 direction.

As illustrated in FIGS. 4 and 5, the first outer member 84 is provided with a first flat plate portion 841 that is long in the Y direction, and a pair of first connecting plate portions 842 extending in the Z2 direction from each of the central portions, with respect to the Y direction, on both ends of the first flat plate portion 841 in the X direction. Both ends of the first flat plate portion 841 in the Y direction are provided with connecting body fixing portions 843, which constitute a pair, disposed on both sides of the first connecting plate portions 842 in the Y direction, respectively. Ends on both sides in the X direction of each of the connecting body fixing portions 843 are provided with raised portions 844 bent in the Z2 direction. As illustrated in FIG. 2, each of the two connecting body fixing portions 843 is connected to the first plate 11 via a first connecting body 9A.

The first inner member 83 is provided with a magnet fixing portion 831 that is long in the Y direction, and raised portions 832, which constitute a pair, bent in the Z2 direction from both ends of the magnet fixing portion 831 in the X direction. The magnet fixing portion 831 is fixed to a surface on the Z1 side of the first flat plate portion 841. That is, in the present embodiment, the first flat plate portion 841 and the magnet fixing portion 831 constitute a first opposed portion which is opposed to the first plate 11 from the Z1 direction side. As illustrated in FIG. 3, the raised portions 832, which constitute a pair, are disposed on the inner sides of the pair of first connecting plate portions 842, and surround both sides in the X direction of the first magnet 71 that is fixed to the magnet fixing portion 831.

As illustrated in FIGS. 4 and 5, the first inner member 83 includes a pair of cutout portions 833 formed by cutting out both ends in the Y direction of the magnet fixing portion 831 toward the center in the Y direction. Each of the cutout portions 833 has a rectangular shape that is long in the X direction, and is provided at the center with respect to the Y direction of the magnet fixing portion 831. As illustrated in FIG. 2, the first connecting body 9A disposed on the Y1 side of the first magnet 71, and the first connecting body 9A disposed on the Y2 side of the first magnet 71 are arranged in the cutout portions 833, respectively.

As illustrated in FIGS. 4 and 5, the second outer member 86 is provided with a second flat plate portion 861 that is long in the Y direction, and a pair of second connecting plate portions 862 extending in the Z1 direction from each of the central portions, with respect to the Y direction, on both ends of the second flat plate portion 861 in the X direction. Both ends of the second flat plate portion 861 in the Y direction are provided with connecting body fixing portions 863, which constitute a pair, disposed on both sides of the second connecting plate portions 862, respectively. Ends on both sides in the X direction of each of the connecting body fixing portions 863 are provided with raised portions 864 bent in the Z1 direction. As illustrated in FIG. 2, each of the two connecting body fixing portions 863 is connected to the second plate 12 via a second connecting body 9B.

The second inner member 85 is provided with a magnet fixing portion 851 that is long in the Y direction, and raised portions 852, which constitute a pair, bent in the Z1 direction from both ends of the magnet fixing portion 851 in the X direction. The magnet fixing portion 851 is fixed to a surface on the Z2 side of the second flat plate portion 861. That is, in the present embodiment, the second flat plate portion 861 and the magnet fixing portion 851 constitute a second opposed portion which is opposed to the second plate 12 from the Z2 direction side. As illustrated in FIG. 3, the raised portions 852, which constitute a pair, are disposed on the inner sides of the pair of second connecting plate portions 862, and surround both sides in the X direction of the second magnet 72 that is fixed to the magnet fixing portion 851.

As illustrated in FIGS. 4 and 5, the second inner member 85 includes a pair of cutout portions 853 formed by cutting out both ends in the Y direction of the magnet fixing portion 851 toward the center in the Y direction. Each of the cutout portions 853 has a rectangular shape that is long in the X direction, and is provided at the center with respect to the Y direction of the magnet fixing portion 851. As illustrated in FIG. 2, the second connecting body 9B disposed on the Y1 side of the second magnet 72, and the second connecting body 9B disposed on the Y2 side of the second magnet 72 are arranged in the cutout portions 853, respectively.

The first yoke 81 is assembled by bonding the first inner member 83 and the first outer member 84 by welding. Further, the second yoke 82 is assembled by bonding the second inner member 85 and the second outer member 86 by welding. The yoke 8 is assembled in a shape that surrounds the outer peripheral side of the first plate 11 and the second plate 12, which are made to overlap the coil 10, in such a way that the pair of second connecting plate portions 862 of the second yoke 82 is press-fitted and fixed to the inner side of the pair of first connecting plate portions 842 of the first yoke 81.

Connecting Body

As illustrated in FIG. 2, the connecting body 4 includes the first connecting bodies 9A and the second connecting bodies 9B. The first connecting bodies 9A and the second connecting bodies 9B each have a rectangular parallelepiped shape that is long in the X direction. The first connecting bodies 9A are positioned on the Z1 side of the coil 10. The second connecting bodies 9B are positioned on the Z2 side of the coil 10.

The first connecting bodies 9A are disposed at two places, which are on the Y1 side and the Y2 side of the first magnet 71, and are formed of two members, which are of the same shape, respectively. The second connecting bodies 9B are disposed at two places, which are on the Y1 side and the Y2 side of the second magnet 72, and are formed of two members, which are of the same shape, respectively. Each of the first connecting bodies 9A and the second connecting bodies 9B exhibits at least one of elasticity and viscoelasticity.

The first connecting bodies 9A are disposed between the first yoke 81 and the first plate 11. The first connecting bodies 9A are disposed in the cutout portions 833 at two places, which are provided at an edge portion of the first yoke 81 in the Y1 direction, and an edge portion of the first yoke 81 in the Y2 direction. The first connecting body 9A on the Y1 side is sandwiched between the connecting body fixing portion 843 provided at an end of the first outer member 84 in the Y1 direction and an edge portion of the first plate 11 in the Y1 direction. The first connecting body 9A on the Y2 side is sandwiched between two locations, which are the connecting body fixing portion 843 that is provided at an end of the first outer member 84 in the Y2 direction, and an edge portion of the first plate 11 in the Y2 direction. The first connecting bodies 9A are compressed in the Z direction between the connecting body fixing portions 843 and the first plate 11.

The second connecting bodies 9B are disposed between the second yoke 82 and the second plate 12. The second connecting bodies 9B are disposed in the cutout portions 853 at two places, which are provided at an edge portion of the second yoke 82 in the Y1 direction, and an edge portion of the second yoke 82 in the Y2 direction. The second connecting body 9B on the Y1 side is sandwiched between the connecting body fixing portion 863 provided at an end of the second outer member 86 in the Y1 direction and an edge portion of the second plate 12 in the Y1 direction. The second connecting body 9B on the Y2 side is sandwiched between two locations, which are the connecting body fixing portion 863 that is provided at an end of the second outer member 86 in the Y2 direction, and an edge portion of the second plate 12 in the Y2 direction. The second connecting bodies 9B are compressed in the Z direction between the connecting body fixing portions 863 and the second plate 12.

In the present embodiment, the first connecting bodies 9A and the second connecting bodies 9B are gel-like members made from silicone gel. Silicone gel is a viscoelastic body whose spring constant obtained when deformation occurs in an expanding/contracting direction is approximately three times greater than the spring constant obtained when deformation occurs in a shear direction. The deformation of the viscoelastic body in the direction (shear direction) that intersects a thickness direction is deformation in a direction in which the viscoelastic body is pulled and stretched. Thus, the viscoelastic body has the deformation characteristics in which a linear component is larger than a nonlinear component. Further, the viscoelastic body has the expansion and contraction characteristics in which while the nonlinear component is larger than the linear component when the viscoelastic body is subjected to compression deformation by being pressed in the thickness direction, the linear component is larger than the nonlinear component when the viscoelastic body is pulled and stretched in the thickness direction.

Alternatively, to form the first connecting bodies 9A and the second connecting bodies 9B, various rubber materials such as natural rubber, diene rubber (e.g., styrene-butadiene rubber, isoprene rubber, butadiene rubber, chloroprene rubber, acrylonitrile-butadiene rubber, etc.), non-diene rubber (e.g., butyl rubber, ethylene propylene rubber, ethylene-propylene-diene rubber, urethane rubber, silicone rubber, fluoro-rubber, etc.), and thermoplastic elastomers, and modified materials of the aforementioned rubber materials may be used.

Coil Assembly

Figure 6:
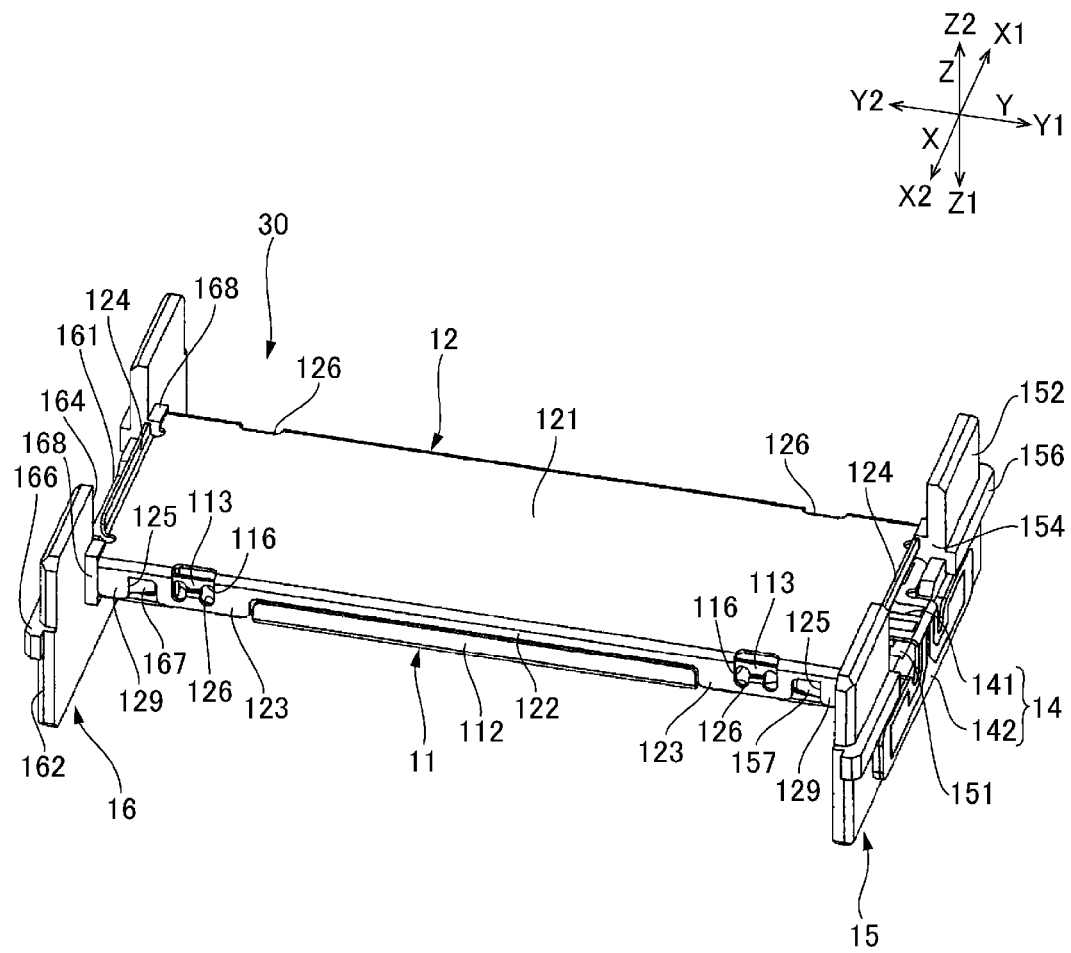
FIG. 6 is a perspective view of a coil assembly.
Figure 7:
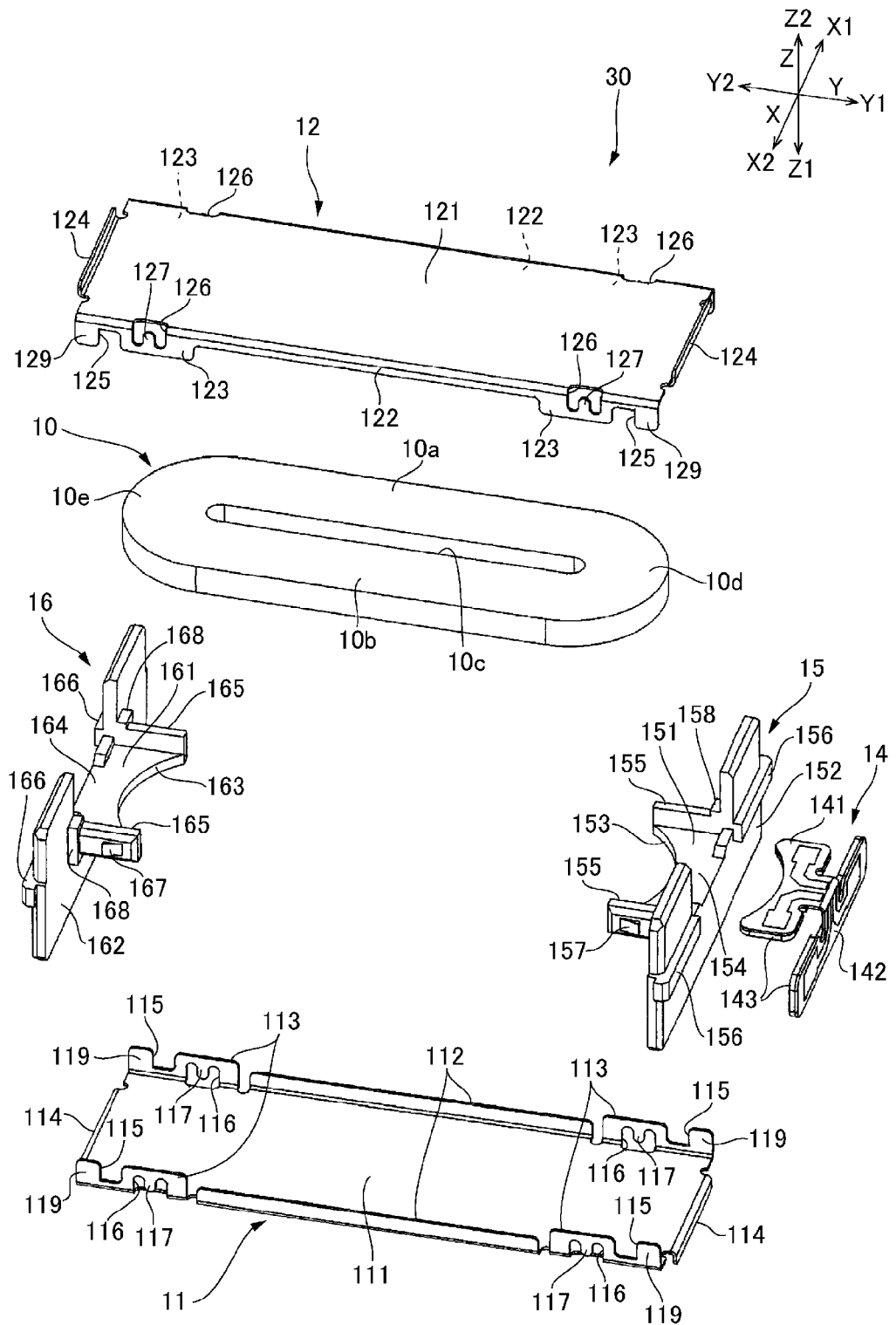
FIG. 7 is an exploded perspective view of the coil assembly.
Figure 8:
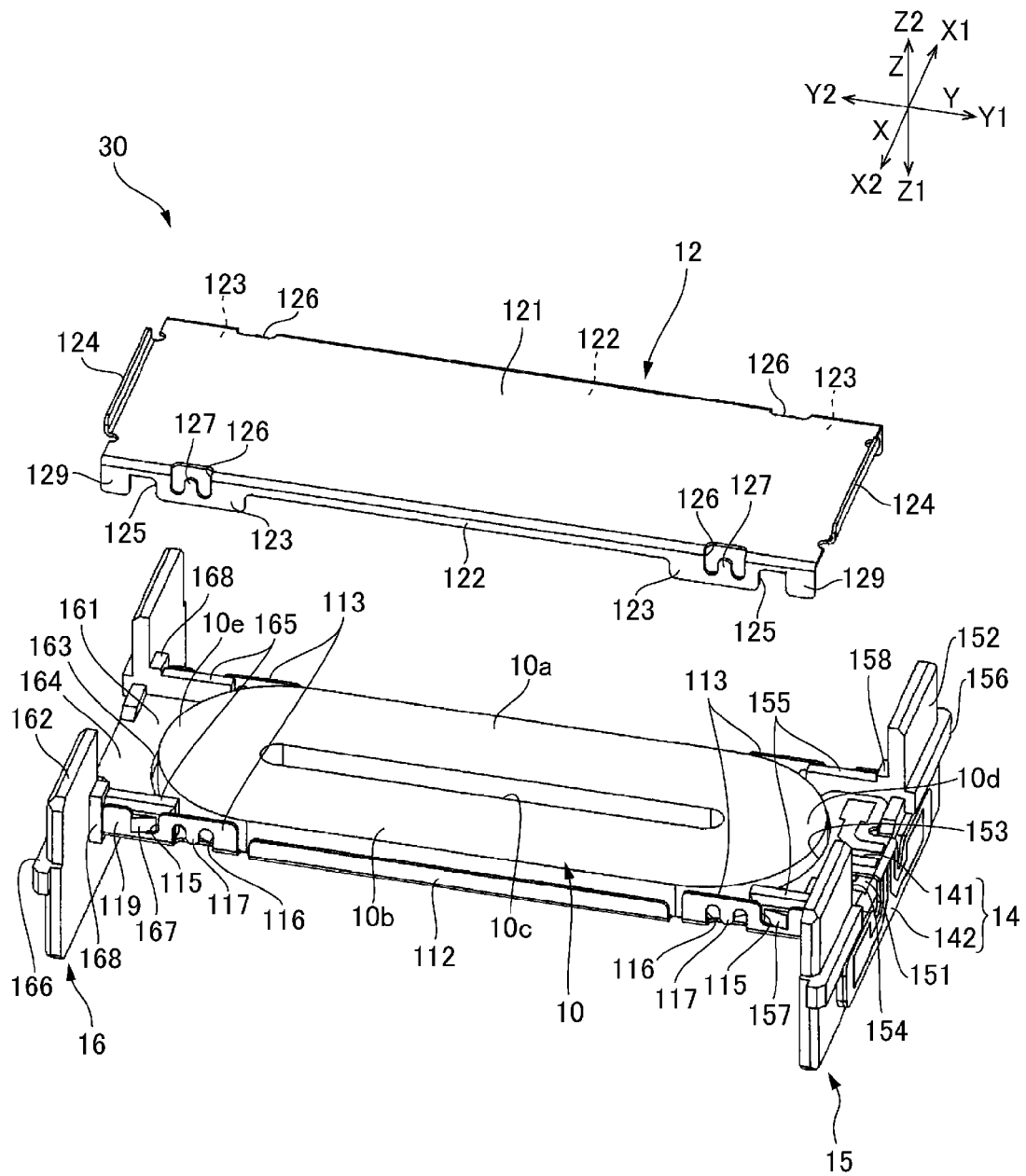
FIG. 8 is an exploded perspective view of an assembled body formed by assembling together a first holder member, a second holder member, a coil, and a first plate, and a second plate.
Figure 9:
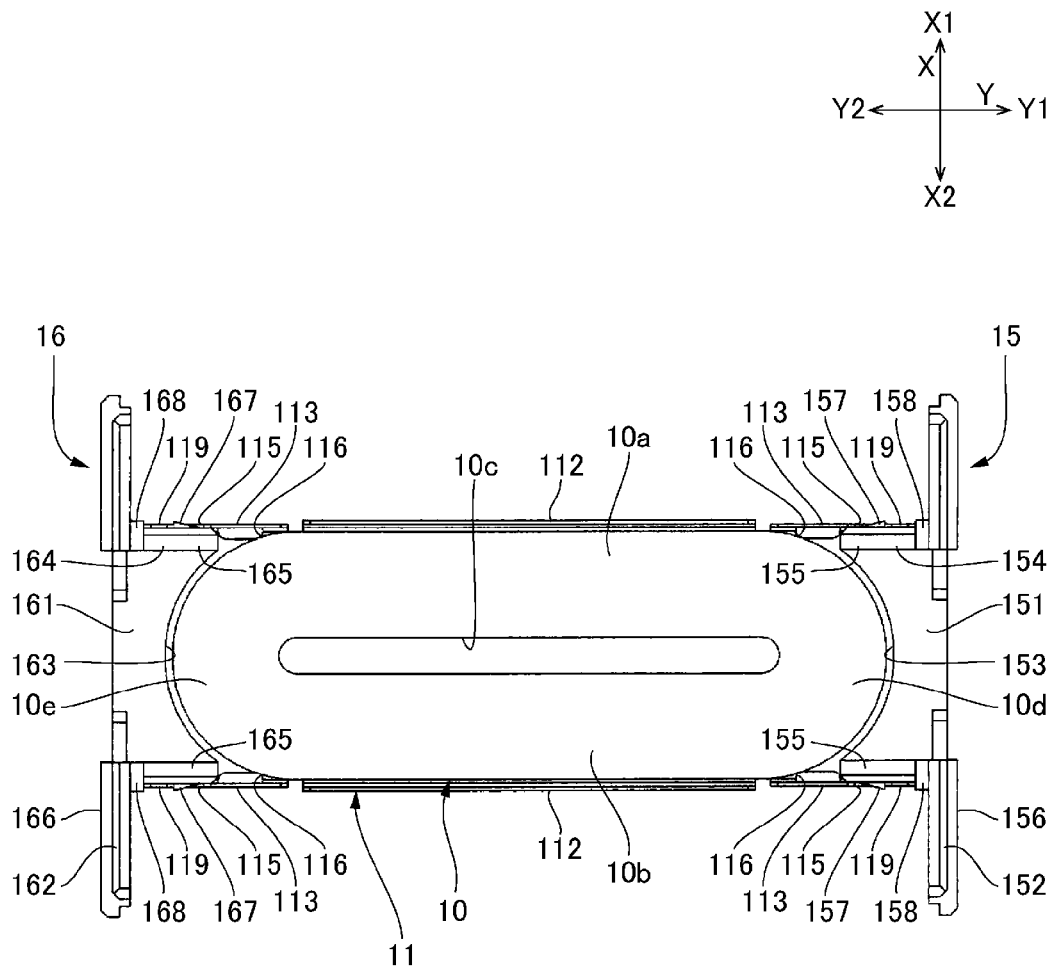
FIG. 9 is a plan view of the assembled body formed by assembling together the first holder member, the second holder member, the coil, and the first plate.

FIG. 6 is a perspective view of the coil assembly 30. FIG. 7 is an exploded perspective view of the coil assembly 30. FIG. 8 is an exploded perspective view of an assembled body formed by assembling together the first holder member 15, the second holder member 16, the coil 10, and the first plate 11, and the second plate 12, and is a perspective view showing the state in the process of assembling the coil assembly 30. FIG. 9 is a plan view of the assembled body formed by assembling together the first holder member 15, the second holder member 16, the coil 10, and the first plate 11. As described above, the support body 3 is provided with the coil assembly 30 formed by assembling together the first holder member 15, the second holder member 16, the coil 10, the first plate 11, and the second plate 12.

The following procedure is performed in assembling the coil assembly 30. First, the first plate 11 is assembled to the first coil holding portion 151 of the first holder member 15, and the second coil holding portion 161 of the second holder member 16 from the Z1 side. Next, the coil 10 is arranged between the first coil holding portion 151 and the second coil holding portion 161, and the power feed substrate 14 is fixed to the first holder member 15 (see FIGS. 7 and 8) so that the power feed substrate 14 is connected to the coil 10. After that, an adhesive is filled into the central hole 10c of the coil 10, and the second plate 12 is assembled from the Z2 side. As illustrated in FIGS. 2 and 3, an adhesive layer 13 formed of the cured adhesive is formed in the central hole 10c of the coil 10. In this way, the coil assembly 30 is completed.

Holder Member

As illustrated in FIGS. 7 and 8, the first holder member 15 includes an arc-shaped recess portion 153 provided at an end portion of the first coil holding portion 151 in the Y2 direction. In the arc-shaped recess portion 153, the arc portion 10d provided at an end portion of the coil 10 in the Y1 direction is arranged. In the first holder member 15, a first recess portion 154, which is recessed in the Z1 direction, is provided at a central portion with respect to the X direction of the first coil holding portion 151 and the first side plate portion 152.

The power feed substrate 14 includes a first substrate part 141 extending in the Y direction in the first recess portion 154, and a second substrate part 142 bent in the Z1 direction from the first substrate part 141 and extends along the first side plate portion 152 in the Z direction. The first substrate part 141 and the second substrate part 142 are fixed to the first coil holding portion 151 and the first side plate portion 152, respectively, via a reinforcing plate 143 (see FIG. 2).

The second holder member 16 includes an arc-shaped recess portion 163 provided at an end portion of the second coil holding portion 161 in the Y1 direction. In the arc-shaped recess portion 163, the arc portion 10e provided at an end portion of the coil 10 in the Y2 direction is arranged. In the second holder member 16, a second recess portion 164, which is recessed in the Z1 direction, is provided at a central portion with respect to the X direction of the second coil holding portion 161 and the second side plate portion 162. In the present embodiment, the position of the coil 10 in the X direction and the Y direction is restricted by the arc-shaped recess portion 153 of the first coil holding portion 151, and the arc-shaped recess portion 163 of the second coil holding portion 161.

The first coil holding portion 151 is provided with receiving surfaces 155 extending in the Y direction on both sides of the first recess portion 154 in the X direction. Also, the second coil holding portion 161 is provided with receiving surfaces 165 extending in the Y direction on both sides of the second recess portion 164 in the X direction. The second plate 12 abuts against the receiving surfaces 155 and 165 from the Z2 direction side. In the present embodiment, the receiving surfaces 155 and 165 are located further in the Z2 direction than the surface of the coil 10 in the Z2 direction.

In the first holder member 15, the first side plate portion 152 includes a first projecting portion 156 protruding from a side surface of the first side plate portion 152 in the Y1 direction. The first projecting portion 156 extends in the X direction on both sides of the first recess portion 154 in the X direction. Also, in the second holder member 16, the second side plate portion 162 includes a second projecting portion 166 protruding from a side surface of the second side plate portion 162 in the Y2 direction. The second projecting portion 166 extends in the X direction on both sides of the second recess portion 164 in the X direction. As illustrated in FIGS. 1A and 1B, in assembling the case 2, the first case member 31 abuts against the first projecting portions 156 and the second projecting portions 166 from the Z1 direction side. Also, the second case member 32 abuts against the first projecting portions 156 and the second projecting portions 166 from the Z2 direction side. Consequently, the first projecting portions 156 of the first side plate portion 152, and the second projecting portions 166 of the second side plate portion 162 function as a positioning portion for positioning the case 2 in the Z direction.

As illustrated in FIG. 2, the first side plate portion 152 is opposed to the yoke 8 from the Y1 direction side. Also, the second side plate portion 162 is opposed to the yoke 8 from the Y2 direction side. Therefore, the first side plate portion 152 and the second side plate portion 162 restrict the movement of the movable body 5 in the Y direction when an impact such as a fall is applied to the actuator 1.

Plate

As illustrated in FIGS. 2, 3, and 7, the first plate 11 includes a first plate portion 111 which overlaps the coil 10 from the Z1 side, and first bending portions 112 bent in the Z2 direction from both ends of the first plate portion 111 in the X direction. The first bending portions 112 are each provided at a central portion of the first plate 11 with respect to the Y direction, and first fixing portions 113 bent in the Z2 direction from the first plate portion 111 are respectively provided on the Y1 side and the Y2 side of the first bending portion 112, for each of the first bending portions 112. Further, at edges on both sides in the Y direction of the first plate portion 111, a first bent portion 114 bent in the Z1 direction is provided.

As illustrated in FIGS. 2, 3, and 7, the second plate 12 includes a second plate portion 121 which overlaps the coil 10 from the Z2 side, and second bending portions 122 bent in the Z1 direction from both ends of the second plate portion 121 in the X direction. The second bending portions 122 are each provided at a central portion of the second plate 12 with respect to the Y direction, and second fixing portions 123 bent in the Z1 direction from the second plate portion 121 are respectively provided on the Y1 side and the Y2 side of the second bending portion 122, for each of the second bending portions 122. Further, at edges on both sides in the Y direction of the second plate portion 121, a second bent portion 124 bent in the Z2 direction is provided.

As illustrated in FIG. 7, the first fixing portions 113 of the first plate 11 and the second fixing portions 123 of the second plate 12 have substantially the same height in the Z direction, and the lengths in the Y direction and the positions thereof are also substantially the same. Meanwhile, the height in the Z direction of the first bending portions 112 of the first plate 11 and the second bending portions 122 of the second plate 12 is lower than that of the first fixing portions 113 and the second fixing portions 123. In the second plate 12, the second fixing portions 123 are continuous with both ends of each second bending portion 122 in the Y direction. In contrast, in the first plate 11, the positions of the first fixing portions 113 and the first bending portions 112 in the X direction are different. More specifically, the first fixing portions 113 are positioned closer to the center with respect to the X direction of the first plate 11 than are the first bending portions 112 (see FIG. 9).

Therefore, as illustrated in FIG. 6, in a state in which the first plate 11 and the second plate 12 are assembled to the first coil holding portion 151 and the second coil holding portion 161 from both sides of the Z direction, the first bending portions 112 of the first plate 11 are each disposed between the two second fixing portions 123 provided on both ends of the second plate 12 in the Y direction, and distal ends of the first bending portions 112 and distal ends of the second bending portions 122 are opposed to each other in the Z direction. In this way, as illustrated in FIG. 3, the first bending portions 112 and the second bending portions 122 cover the long side portions 10a and 10b of the coil 10. In the present embodiment, there is a gap in the X direction between the coil 10 and the first bending portion 112 and the second bending portion 122. However, the coil 10 and the first bending portions 112 and the second bending portions 122 may be in contact with each other in the X direction.

At both end portions of the first plate 11 and the second plate 12 in the Y direction, in each of four places that are on both sides of the arc portion 10d of the coil 10 in the X direction, and both sides of the arc portion 10e in the X direction, the second fixing portion 123 of the second plate 12 overlaps the first fixing portion 113 of the first plate 11 such that the second fixing portion 123 is positioned on the outer side. As described above, although the first fixing portion 113 is positioned closer to the center with respect to the X direction of the first plate 11 than is the first bending portion 112, the first fixing portion 113 is disposed not on the outer side of the long side portions 10a and 10b in the X direction, but on the outer side of the arc portions 10d and 10e in the X direction. For this reason, the first fixing portion 113 does not come into contact with the coil 10.

As illustrated in FIG. 7, for each of the four first fixing portions 113 provided on the first plate 11, a first cutout portion 115 of a rectangular shape cut out in the Z1 direction, and a first opening portion 116 extending to a corner portion connecting the first fixing portion 113 and the first plate portion 111 are provided next to each other in the Y direction. At the center of an edge in the Z2 direction of the first opening portion 116, a first protruding portion 117 extending in the Z1 direction is provided. Further, for each of the four second fixing portions 123 provided on the second plate 12, a second cutout portion 125 of a rectangular shape cut out in the Z2 direction, and a second opening portion 126 extending to a corner portion connecting the second fixing portion 123 and the second plate portion 121 are provided next to each other in the Y direction. At the center of an edge in the Z1 direction of the second opening portion 126, a second protruding portion 127 extending in the Z2 direction is provided.

As illustrated in FIG. 6, in a state in which the first plate 11 and the second plate 12 are assembled to the first coil holding portion 151 and the second coil holding portion 161 from both sides of the Z direction, the first cutout portion 115 of the first fixing portion 113 and the second cutout portion 125 of the second fixing portion 123 overlap one another. As illustrated in FIGS. 7 and 9, a claw portion 157 protrudes from side surfaces on both sides of the first coil holding portion 151 in the X direction, and a claw portion 167 protrudes from side surfaces on both sides of the second coil holding portion 161 in the X direction. The claw portions 157 at the two places each fit into the first cutout portion 115 and the second cutout portion 125, and an end surface on the Y1 side of each of the claw portions 157 abuts against edges on the Y1 side of the first cutout portion 115 and the second cutout portion 125. Similarly, the claw portions 167 at the two places each fit into the first cutout portion 115 and the second cutout portion 125, and an end surface on the Y2 side of each of the claw portions 167 abuts against edges on the Y2 side of the first cutout portion 115 and the second cutout portion 125. In this way, the first coil holding portion 151 and the second coil holding portion 161 are prevented from coming off from between the first plate 11 and the second plate 12, and are held at positions separated from each other in the Y direction by the first plate 11 and the second plate 12.

The claw portion 157 provided on the first coil holding portion 151 has a tapered shape in which the protruding dimension in the X direction increases toward the Y1 direction. Therefore, assembly can be conducted by a procedure of first assembling the first plate 11 and the second plate 12 such that they overlap the coil 10 in the Z direction, and then inserting the first coil holding portion 151 between the first plate portion 111 and the second plate portion 121 from the Y1 direction side. In this case, since a side surface in the X direction of the claw portion 157 is an inclined surface, the first coil holding portion 151 can be inserted while flexing the first fixing portion 113 and the second fixing portion 123 in the X direction along the inclined surface of the claw portion 157, and the claw portion 157 can be engaged with the first cutout portion 115 and the second cutout portion 125.

Similarly, the claw portion 167 provided on the second coil holding portion 161 has a tapered shape in which the protruding dimension in the X direction increases toward the Y2 direction. Therefore, assembly can be conducted by a procedure of first assembling the first plate 11 and the second plate 12 such that they overlap the coil 10 in the Z direction, and then inserting the second coil holding portion 161 between the first plate portion 111 and the second plate portion 121 from the Y2 direction side. In this case, since a side surface in the X direction of the claw portion 167 is an inclined surface, the second coil holding portion 161 can be inserted while flexing the first fixing portion 113 and the second fixing portion 123 in the X direction along the inclined surface of the claw portion 167, and the claw portion 167 can be engaged with the first cutout portion 115 and the second cutout portion 125.

Figure 10:
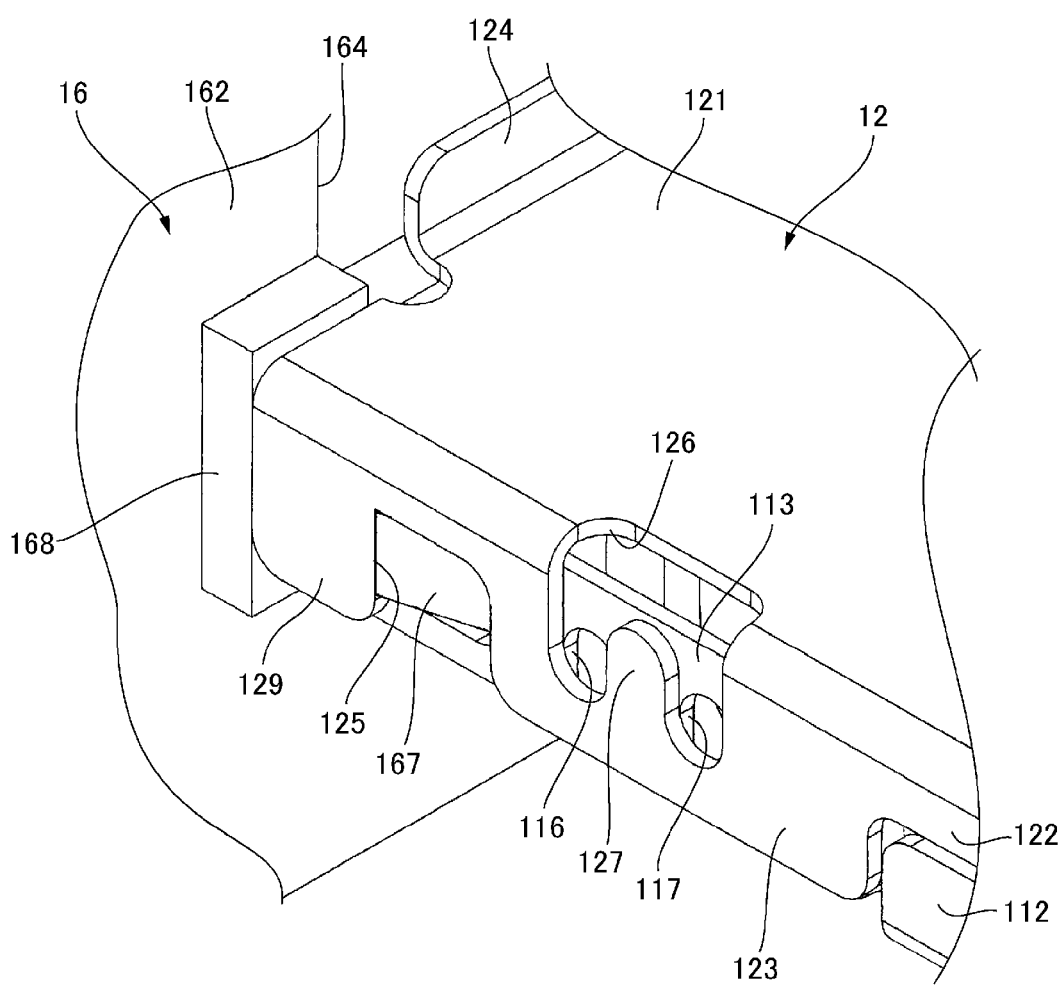
FIG. 10 is an explanatory diagram of a fixing structure of the first plate and the second plate, and is a perspective view of a state before a first protruding portion and a second protruding portion are bent.
Figure 11:
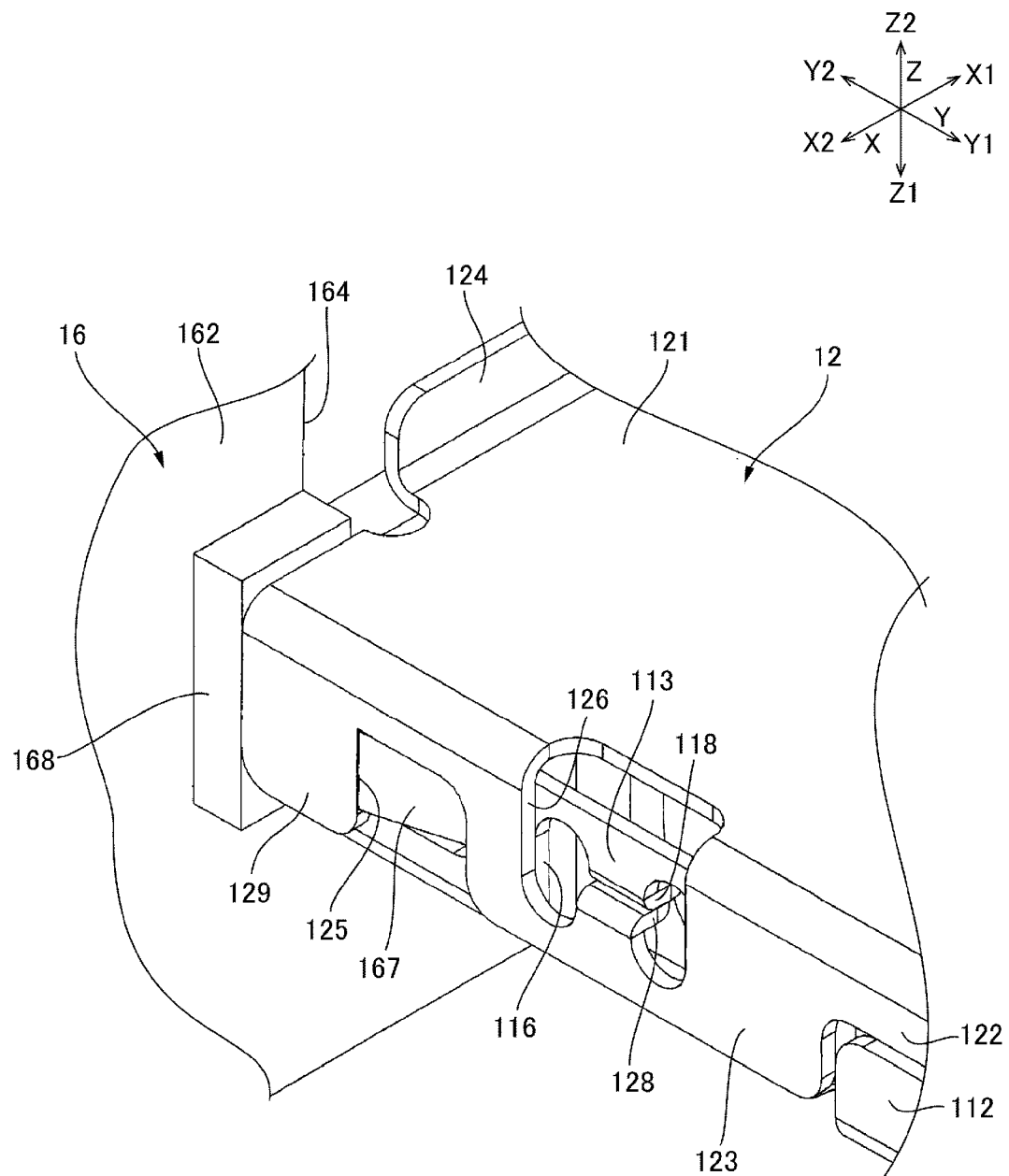
FIG. 11 is an explanatory diagram of the fixing structure of the first plate and the second plate, and is a perspective view of a state in which the first protruding portion and the second protruding portion are bent in X direction, and are made to abut against each other in Z direction.

FIGS. 10 and 11 are explanatory diagrams of a fixing structure of the first plate 11 and the second plate 12.

FIG. 10 is a perspective view of a state before the first protruding portion 117 and the second protruding portion 127 are bent. FIG. 11 is a perspective view of a state in which the first protruding portion 117 and the second protruding portion 127 are bent in the X direction and made to abut against each other in the Z direction. As illustrated in FIG. 7, in a state before the first plate 11 and second plate 12 are assembled, the first protruding portion 117 and the second protruding portion 127 are not bent but extend in the Z direction. As illustrated in FIG. 6, when the first plate 11 and second plate 12 are assembled to the first holder member 15 and the second holder member 16 from both sides of the Z direction, the first fixing portions 113 at four places overlap with the second fixing portions 123, respectively.

At this time, as illustrated in FIG. 10, the first opening portion 116 of the first fixing portion 113 and the second opening portion 126 of the second fixing portion 123 overlap one another, and the first protruding portion 117 and the second protruding portion 127 overlap one another.

By pressing the part where the first protruding portion 117 and the second protruding portion 127 overlap one another by a jig toward the inside, as illustrated in FIG. 11, a first bent portion 118 made by bending a distal end of the first protruding portion 117 in the X direction is formed, and also a second bent portion 128 made by bending a distal end of the second protruding portion 127 in the X direction is formed. As a result, a state in which the first bent portion 118 and the second bent portion 128 abut against each other in the Z direction is obtained. This causes the first plate 11 and the second plate 12 to be engaged in the Z direction, and the second plate 12 will not be disengaged from the first plate 11.

The first opening portion 116 and the second opening portion 126 are disposed on both sides in the X direction of the arc portions 10d and 10e of the coil 10. Accordingly, when the first protruding portion 117 and the second protruding portion 127 are bent inwardly, distal ends of the first bent portion 118 and the second bent portion 128 do not contact an outer peripheral surface of the arc portions 10d and 10e. Thus, it is possible to avoid causing damage to the coil 10 during assembly of the coil assembly 30.

As illustrated in FIGS. 7 and 9, in the second holder member 16, a second step portion 168 protrudes in the Y1 direction to surround the second coil holding portion 161, from the surface on the Y1 side of the second side plate portion 162. Similarly, in the first holder member 15, a first step portion 158 protrudes in the Y2 direction to surround the first coil holding portion 151, from the surface on the Y2 side of the first side plate portion 152.

As illustrated in FIGS. 7 and 8, at an end portion of the first plate 11 in the Y2 direction, the first fixing portion 113 includes a first end portion 119 extending in the Z2 direction at a position adjacent to the first cutout portion 115 in the Y2 direction. When the second holder member 16 is assembled to the first plate 11 from the Z2 side, the claw portion 167 is arranged in the first cutout portion 115, and the first end portion 119 fits into a gap between the claw portion 167 and the second step portion 168. The width of the first end portion 119 is a dimension which allows the first end portion 119 to be lightly press-fitted into the gap between the claw portion 167 and the second step portion 168.

Also in the first fixing portion 113 provided at an end portion of the first plate 11 in the Y1 direction, similarly, the first end portion 119 extending in the Z2 direction is provided at a position adjacent to the first cutout portion 115 in the Y1 direction. When the claw portion 157 of the first holder member 15 is arranged in the first cutout portion 115, the first end portion 119 is lightly press-fitted into a gap between the claw portion 157 and the first step portion 158.

Also in the second fixing portion 123 provided at an end portion of the second plate 12 in the Y2 direction, and at an end portion of the same in the Y1 direction, similarly, a second end portion 129 is provided at a position adjacent to the second cutout portion 125. The second end portion 129 provided at the end portion of the second plate 12 in the Y2 direction overlaps the first end portion 119, and is lightly press-fitted into the gap between the claw portion 167 and the second step portion 168. The second end portion 129 provided at the end portion of the second plate 12 in the Y1 direction overlaps the first end portion 119, and is lightly press-fitted into the gap between the claw portion 157 and the first step portion 158. In this way, the first holder member 15 and the second holder member 16 are positioned in the Y direction with respect to the first plate 11 and the second plate 12.

Operation of Actuator

When a current in a predetermined direction is supplied to the coil 10 via the power feed substrate 14, the movable body 5 supported by the support body 3 moves relative to the support body 3 in a direction corresponding to one side of the X direction by a driving force of the magnetic drive circuit 6. After that, when the direction of the current is reversed, the movable body 5 moves relative to the support body 3 in a direction corresponding to the other side of the X direction. As reversal of the directions of the current supplied to the coil 10 is repeated, the movable body 5 is vibrated. When the movable body 5 vibrates in the X direction, the first connecting bodies 9A and the second connecting bodies 9B deform in the shear direction.

Main Advantageous Effects of Present Embodiment

As described above, the actuator 1 of the present embodiment includes: the movable body 5; the support body 3 including the case 2 which accommodates the movable body 5; the connecting body 4 connected to the movable body 5 and the support body 3; and the magnetic drive circuit 6 which includes the coil 10 and the magnet 7 that is opposed to the coil 10 in the Z direction (the first direction), and causes the movable body 5 to vibrate relative to the support body 3 in the X direction (the second direction). The support body 3 is provided with: the first holder member 15, which is made of resin, including the first coil holding portion 151 disposed in the Y1 direction (one side of the third direction) with respect to the coil 10, and the first side plate portion 152 extending in the Z direction from an end of the first coil holding portion 151 in the Y1 direction; and the second holder member 16, which is made of resin, including the second coil holding portion 161 disposed in the Y2 direction (the other side of the third direction) with respect to the coil 10, and the second side plate portion 162 extending in the Z direction from an end of the second coil holding portion 161 in the Y2 direction. In addition, the support body 3 is provided with: the first plate 11 made of metal and overlapping the coil 10, the first coil holding portion 151, and the second coil holding portion 161 from the Z1 direction side (one side of the first direction); and the second plate 12 made of metal and overlapping the coil 10, the first coil holding portion 151, and the second coil holding portion 161 from the Z2 direction side (the other side of the first direction). The first plate 11 and the second plate 12 are positioned with respect to the first coil holding portion 151 and the second coil holding portion 161, and the case 2 is positioned with respect to the first side plate portion 152 and the second side plate portion 162.

In the present embodiment, a resin component for holding the coil (i.e., a conventional coil holder) is divided into two members. By such division, both sides of the coil 10 in the X direction conventionally surrounded by resin are kept not to be surrounded by resin. Therefore, the coil 10 can be made larger without increasing the dimension of the coil assembly 30 in the X direction. By this feature, since the magnetic drive circuit 6 can generate a large driving force, the actuator 1 can output a large vibration. Further, the case 2, the first plate 11, and the second plate 12 are all positioned with respect to the first holder member 15 and the second holder member 16. Therefore, the case 2 can be positioned accurately. Also, the coil 10 can be positioned accurately via the first plate 11 and the second plate 12.

In the present embodiment, the first plate 11 includes: the first plate portion 111 overlapping the coil 10, the first coil holding portion 151, and the second coil holding portion 161 from the Z1 direction side; and the first bending portions 112 bent in the Z2 direction from the ends of the first plate portion 111 in the X direction. The second plate 12 includes: the second plate portion 121 overlapping the coil 10, the first coil holding portion 151, and the second coil holding portion 161 from the Z2 direction side; and the second bending portions 122 bent in the Z1 direction (one side of the first direction) from the ends of the second plate portion 121 in the X direction. The first bending portions 112 and the second bending portions 122 cover side surfaces of the coil 10 in the X direction. As described above, by providing the bending portions that extend in the Y direction, rigidity against bending in the Y direction is increased. Therefore, the rigidity of the first plate 11 and the second plate 12 can be increased. Further, since the first bending portions 112 and the second bending portions 122 can cover the side surfaces of the coil 10 in a vibration direction (X direction), it is possible to prevent the coil 10 from colliding with the movable body 5 and being damaged.

In the present embodiment, the first plate 11 includes the first fixing portion 113 bent in the Z2 direction from edges on both sides of the X direction at both ends of the first plate portion 111 in the Y direction (third direction). The second plate 12 includes the second fixing portion 123 bent in the Z1 direction from edges on both sides of the X direction at both ends of the second plate portion 121 in the Y direction. The claw portions 157 are provided on the side surfaces on both sides of the first coil holding portion 151 in the X direction, and the claw portions 167 are provided on the side surfaces on both sides of the second coil holding portion 161 in the X direction. In four places that are on both sides of the first coil holding portion 151 in the X direction, and both sides of the second coil holding portion 161 in the X direction, the first cutout portion 115 provided in the first fixing portion 113 and the second cutout portion 125 provided in the second fixing portion 123 overlap one another in the X direction. The claw portion 157 or the claw portion 167 is engaged with each of the four first cutout portions 115 and second cutout portions 125 that overlap one another in the X direction. By this feature, the first coil holding portion 151 and the second coil holding portion 161 are prevented from coming off from between the first plate 11 and the second plate 12, and the first holder member 15 and the second holder member 16 are positioned in the Y direction. Moreover, the first plate 11 and the second plate 12 can be positioned in the Y direction via the claw portions 157 and 167. Furthermore, the coil assembly 30 can be assembled without welding or using fixing components.

In the present embodiment, at an edge in the Z2 direction of the first opening portion 116 provided in the first fixing portion 113, the first bent portion 118 extending in the Z1 direction, and then bent toward the center of the first plate portion 111 in the X direction is provided. At an edge in the Z1 direction of the second opening portion 126 provided in the second fixing portion 123, the second bent portion 128 extending in the Z2 direction, and then bent toward the center of the second plate portion 121 in the X direction is provided. In assembling the coil assembly 30, the assembly is conducted such that the second bent portion 128 abuts against the first bent portion 118 from the Z2 direction side, and the second plate 12 is thereby engaged with the first plate 11 in the Z direction. By adopting such an engagement structure, in the present embodiment, the coil assembly 30 can be assembled by a method of positioning the first plate 11 and the second plate 12 such that the first opening portion 116 and the second opening portion 126 overlap one another, and pressing the edge of the first opening portion 116 and the edge of the second opening portion 126 by a jig from the outside, thereby forming the first bent portion 118 and the second bent portion 128. Thus, assembly work of the coil assembly 30 is easy. In addition, since such a fixing structure is realized by simply forming an opening portion at a predetermined position in the plate, manufacturing of the components is easy.

In the present embodiment, the claw portion 157 provided on the first coil holding portion 151 has a tapered shape in which the protruding dimension in the X direction increases toward the Y1 direction. Further, the claw portion 167 provided on the second coil holding portion 161 has a tapered shape in which the protruding dimension in the X direction increases toward the Y2 direction. As described above, because of the feature that the claw portions 157 and 167 are formed in the tapered shape, it is possible to adopt an assembling method of assembling the coil assembly 30 whereby the assembly is conducted by first assembling the first plate 11 and the second plate 12, and inserting the first coil holding portion 151 and the second coil holding portion 161 between the first plate 11 and the second plate 12, while pressing and flexing the first fixing portion 113 of the first plate 11 and the second fixing portion 123 of the second plate 12 by the inclined surfaces provided on the claw portions 157 and 167.

In the present embodiment, the first plate 11 includes a first raised portion extending in the Z1 direction (one side of the first direction) from an edge on both sides of the first plate portion 111 in the Y direction (third direction), and the second plate 12 includes a second raised portion extending in the Z2 direction (the other side of the first direction) from an edge on both sides of the second plate portion 121 in the Y direction (third direction). As described above, by providing the raised portions extending in the Y direction, rigidity of the first plate 11 and the second plate 12 against bending in the X direction can be increased.

In the present embodiment, the movable body 5 includes the yoke 8 which holds the magnet 7. The yoke 8 includes the first opposed portion (the first flat plate portion 841 and the magnet fixing portion 831) opposed to the first plate 11 from the Z1 direction side, the second opposed portion (the second flat plate portion 861 and the magnet fixing portion 851) opposed to the second plate 12 from the Z2 direction side, and a pair of connection portions (the first connecting plate portions 842 and the second connecting plate portion 862) disposed on both sides of the coil 10 in the X direction (second direction). The first side plate portion 152 is opposed to the yoke 8 from the Y1 direction side, and the second side plate portion 162 is opposed to the yoke 8 from the Y2 direction side. As described above, the present embodiment is configured such that the first side plate portion 152 and the second side plate portion 162 are opposed to each other from both sides of the Y direction with respect to the yoke 8 surrounding the periphery of a central portion of the coil assembly 30 with respect to the Y direction. Thus, when an impact such as a fall is applied, the first side plate portion 152 and the second side plate portion 162 function as a stopper which restricts the movement of the movable body 5 in the Y direction (third direction). Therefore, it is possible to suppress breaking of the actuator 1 due to an impact such as a fall.

In the present embodiment, the connecting body 4 includes the first connecting body 9A to connect the first opposed portion (the connecting body fixing portion 843 of the first flat plate portion 841) and the first plate 11, and the second connecting body 9B to connect the second opposed portion (the connecting body fixing portion 863 of the second flat plate portion 861) and the second plate 12. With such a configuration, since the connecting body 4 can be arranged inside the yoke 8 to connect the coil assembly 30 to the yoke 8, there is no need to secure a space for arranging the connecting body 4 in a gap between the case 2 and the yoke 8. Therefore, the dimension of the actuator 1 in the Z direction (first direction) can be reduced.

Other Embodiments

While the present embodiment includes the first magnet 71 and the second magnet 72 as the magnet 7, the present embodiment may be configured to include only one of the first magnet 71 and the second magnet 72. Further, as the connecting body 4, it is possible to adopt a configuration in which only one of the first connecting body 9A and the second connecting body 9B is provided. Furthermore, while the yoke 8 is configured by layering the inner member and the outer member as a laminate, it is possible to adopt a configuration in which the yoke 8 is configured from only the outer member.

What is claimed is:

1. An actuator comprising:
   a movable body;
   a support body comprising a case which accommodates the movable body;
   a connecting body connected to the movable body and the support body; and
   a magnetic drive circuit which comprises a coil and a magnet that is opposed to the coil in a first direction, and causes the movable body to vibrate relative to the support body in a second direction intersecting the first direction, wherein
   the support body comprises:
   a first holder member, which is made of resin, comprising a first coil holding portion disposed on one side of a third direction intersecting the first direction and also the second direction with respect to the coil, and a first side plate portion extending in the first direction from an end of the first coil holding portion on the one side of the third direction;
   a second holder member, which is made of resin, comprising a second coil holding portion disposed on an other side of the third direction with respect to the coil, and a second side plate portion extending in the first direction from an end of the second coil holding portion on the other side of the third direction;
   a first plate made of metal and overlapping the coil, the first coil holding portion, and the second coil holding portion from one side of the first direction; and
   a second plate made of metal and overlapping the coil, the first coil holding portion, and the second coil holding portion from an other side of the first direction, and wherein
   the first plate and the second plate are positioned with respect to the first coil holding portion and the second coil holding portion, and
   the case is positioned with respect to the first side plate portion and the second side plate portion.

2. The actuator according to claim 1, wherein:
   the movable body comprises a yoke holding the magnet;
   the yoke comprises a first opposed portion opposed to the first plate from the one side of the first direction, a second opposed portion opposed to the second plate from the other side of the first direction, and a pair of connection portions disposed on both sides of the coil in the second direction;
   the first side plate portion is opposed to the yoke from the one side of the third direction; and
   the second side plate portion is opposed to the yoke from the other side of the third direction.

3. The actuator according to claim 2, wherein the connecting body comprises:
   a first connecting body to connect the first opposed portion and the first plate; and
   a second connecting body to connect the second opposed portion and the second plate.

4. The actuator according to claim 1, wherein:
   the first plate comprises a first plate portion overlapping the coil, the first coil holding portion, and the second coil holding portion from the one side of the first direction, and a first bending portion bent in the other side of the first direction from ends of the first plate portion in the second direction;
   the second plate comprises a second plate portion overlapping the coil, the first coil holding portion, and the second coil holding portion from the other side of the first direction, and a second bending portion bent in the one side of the first direction from ends of the second plate portion in the second direction; and
   the first bending portion and the second bending portion cover side surfaces of the coil in the second direction.

5. The actuator according to claim 4, wherein:
   the first plate comprises a first fixing portion bent in the other side of the first direction from edges on both sides of the second direction at both ends of the first plate portion in the third direction;
   the second plate comprises a second fixing portion bent in the one side of the first direction from edges on both sides of the second direction at both ends of the second plate portion in the third direction;
   at an edge on the other side of the first direction of a first opening portion provided in the first fixing portion, a first bent portion extending in the one side of the first direction, and then bent toward a center of the first plate portion in the second direction is provided;
   the second fixing portion overlaps the first fixing portion in the second direction;
   at an edge on the one side of the first direction of a second opening portion provided in the second fixing portion, a second bent portion extending in the other side of the first direction, and then bent toward a center of the second plate portion in the second direction is provided; and
   the second plate is engaged with the first plate in the first direction as the second bent portion abuts against the first bent portion from the other side of the first direction.

6. The actuator according to claim 4, wherein:
   the first plate comprises a first raised portion extending in the one side of the first direction from an edge on both sides of the first plate portion in the third direction; and
   the second plate comprises a second raised portion extending in the other side of the first direction from an edge on both sides of the second plate portion in the third direction.

7. The actuator according to claim 4, wherein:
   the first plate comprises a first fixing portion bent in the other side of the first direction from edges on both sides of the second direction at both ends of the first plate portion in the third direction;
   the second plate comprises a second fixing portion bent in the one side of the first direction from edges on both sides of the second direction at both ends of the second plate portion in the third direction;
   a claw portion is provided at each of four places on side surfaces on both sides of the first coil holding portion in the second direction, and side surfaces on both sides of the second coil holding portion in the second direction; and
   at each of the four places on the both sides of the first coil holding portion in the second direction, and the both sides of the second coil holding portion in the second direction, a first cutout portion provided in the first fixing portion and a second cutout portion provided in the second fixing portion overlap one another in the second direction, and the claw portion is engaged with the first cutout portion and the second cutout portion.

8. The actuator according to claim 7, wherein:
the claw portion provided on the first coil holding portion has a tapered shape in which a protruding dimension in the second direction increases toward the one side of the third direction; and
the claw portion provided on the second coil holding portion has a tapered shape in which a protruding dimension in the second direction increases toward the other side of the third direction.

9. The actuator according to claim 7, wherein:
at an edge on the other side of the first direction of a first opening portion provided in the first fixing portion, a first bent portion extending in the one side of the first direction, and then bent toward a center of the first plate portion in the second direction is provided;
at an edge on the one side of the first direction of a second opening portion provided in the second fixing portion, a second bent portion extending in the other side of the first direction, and then bent toward a center of the second plate portion in the second direction is provided; and
the second plate is engaged with the first plate in the first direction as the second bent portion abuts against the first bent portion from the other side of the first direction.

* * * * *